L. & S. P. Holden.
Boots & Shoes.
No. 1842. Reissued Dec. 27. 1864.
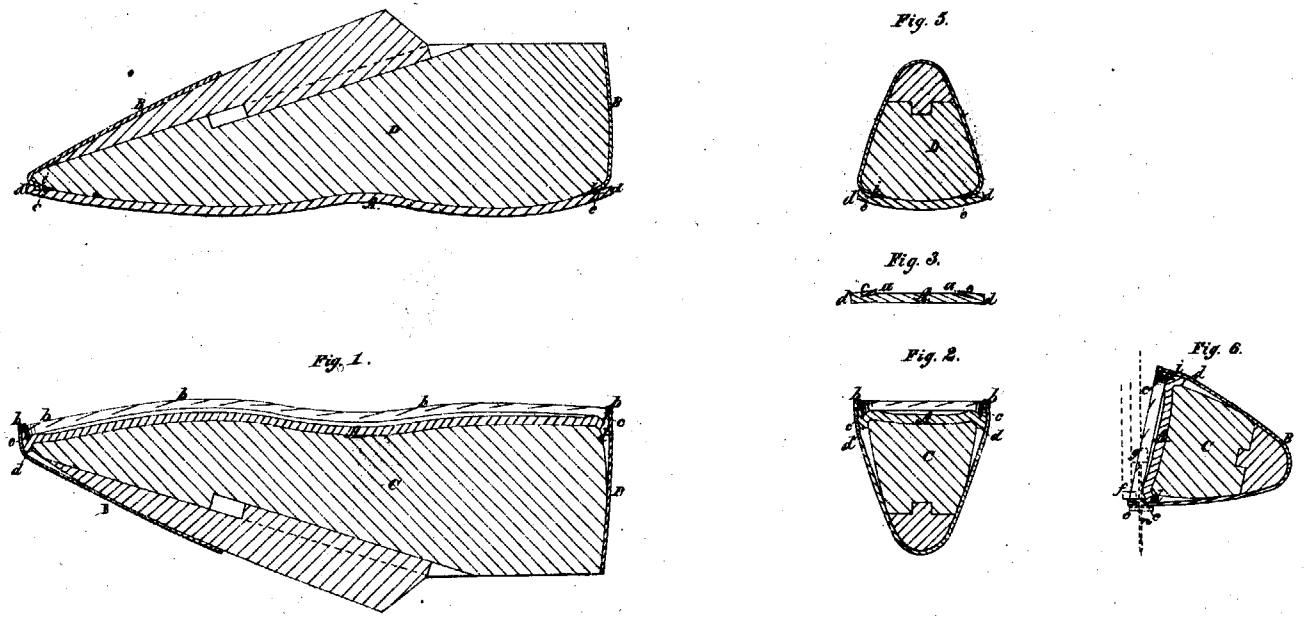
Witnesses,
James Lara
Lewis A. Bucker
Inventors,
L. Holden
S. P. Holden
per Munn & Co
Attorneys

UNITED STATES PATENT OFFICE.

THE McKAY TURNED SHOE COMPANY, OF MASSACHUSETTS, ASSIGNEES, BY MESNE ASSIGNMENTS, OF L. H. & S. B. HOLDEN.

IMPROVEMENT IN BOOTS AND SHOES.

Specification forming part of Letters Patent No. 31,929, dated April 2, 1861; Reissue No. 1,812, dated December 27, 1864.

DIVISION B.

*To all whom it may concern:*

Be it known that LUTHER HOLDEN and STOUGHTON B. HOLDEN, both of Woburn, in the county of Middlesex, in the State of Massachusetts, have invented a new and Improved Manufacture of Boots and Shoes, of which the following is a clear, full, and exact description, reference being had to the accompanying drawings, forming part of this specification.

The invention consists in a turned boot or shoe in which the stitches uniting the vamp and sole pass through a lip or flap, which is made from and is temporarily raised above the general surface of the sole, the stitches being made by mechanism and passing through the vamp as well as said flap or lip, but not through any other part of the sole.

Figure 1 of the drawings shows in longitudinal section a sole and vamp prepared and lasted for sewing in accordance with this invention. Fig. 2 shows a cross-section of the same. Fig. 3 shows the sole in cross-section after the cut is made therein which forms the lip or flap *c*. Fig. 4 shows a longitudinal section of the shoe on the finishing-last after the sewing has been performed and the shoe turned. Fig. 5 shows a cross-section of said last and the shoe in the condition just named. Fig. 6 is a sectional view illustrating the manner in which the flap of the sole and vamp are sewed together on a sewing-machine.

Similar letters of reference indicate corresponding parts in the several figures.

The lip or flap *c* is formed by cutting into a properly-shaped sole of leather or other suitable material, and from that surface thereof which comes innermost in the finished shoe, and from within the edge or outline of the sole, but extending toward it, the depth and width of the cut being proportioned somewhat to the thickness of the vamp and sole. The last C on which the shoe is lasted and the sewing is performed is made both narrower and shorter all around than the finishing-last D, which is used after the shoe is turned to allow the edge *d* of the sole to be turned down all around, as seen in Figs. 1, 2, and 6, so as to bring the lip or flap *c* of the sole A into the position shown in said figures—that is, about at right angles, or nearly so, to the general surface of the sole. The manipulation of the sole A to make the flap *c* assume said position may be performed either before or after the sole is placed and temporarily secured on last C.

When the edge of the sole A is turned over the edge of the sole of last C, then the vamp B (being "closed" and arranged "inside out"—that is, with the surface thereof which comes outward in the finished shoe so placed as to come against the surface of last *c*) is drawn closely to said last, and is temporarily secured to the sole by stitches *b*, or otherwise. In this condition the parts are easily united by the action of a sewing-machine, as illustrated by Fig. 6, where *e* represents the rest or bed of a sewing-mechanism, *f*, the presser-bar *g*, the needle-bar, and *n*, the needle; and it may here be remarked that the sole-face of last C may be made concave to give room for the operation of the mechanism.

When the seam around the sole is completed, leaving stitches, as at *i*, which are formed very close to the general surface of the sole and close to the angle which the flap *c* forms therewith, the flap *c* and that part of the vamp B through which the stitches *i* pass are pressed down to the general surface of the sole, and the superfluous portion of the edge of the vamp trimmed as near to the seam of stitches *i*, as a proper regard for strength will permit. Then the last C is extracted from the boot or shoe, which is then completely turned while in "temper," or in a damp and pliable condition, and the finishing-last D is inserted, and the boot or shoe is finished thereon in the usual manner.

In those "turns" which have heretofore been made by hand a slight gash has been made in the sole from that surface which is ultimately innermost, and awl-holes were then made in the solid part of the sole, extending through the vamp, said holes commencing in the sole at the angle formed therewith by the flap made by the gash, this angle serving as a guide to the awl in entering the sole, and the perforations of the awl being made not in the flap as in this invention, but in the sole, and with a curved awl. In these hand-made "turns" the stitch was sunken or inserted in the sole below the said angle, and in wear the stitches were reached before the sole was worn through to the angle, and when the stitches were thus reached and worn through the work would rip. Skill of manipulation was needed in the operative to secure exit of his awl-point at a uniform distance from the edge of the sole, for unless this was secured the irregularities become apparent when the shoe was turned, and the appearance and value of the article were injured. In such work also, when made in the usual way as "turns" by hand, the tension upon the thread often corrugated or puckered the surface of the sole near its edge. All of these defects are remedied by this invention, which from the fact that the stitches do not pass into the body of the sole, makes a more yielding shoe than the hand-made "turn," and the method of construction also secures uniformity of the seam from the sole-edge, and consequent symmetry of the article, while the sewing of the seam by mechanism results in economy of labor, while uniformity and superiority of the product follows.

I claim—

A boot or shoe having the construction substantially as specified.

Executed this 31st day of August, A. D. 1864.

THE McKAY TURNED SHOE COMPANY,
By its President,
DAVID L. WEBSTER.

In presence of—
J. B. CROSBY,
FRANCIS GOULD.